(12) United States Patent
Morgan et al.

(10) Patent No.: US 9,940,616 B1
(45) Date of Patent: Apr. 10, 2018

(54) VERIFYING PROXIMITY DURING PAYMENT TRANSACTIONS

(71) Applicant: Square, Inc., San Francisco, CA (US)

(72) Inventors: Timothy Ben Morgan, San Francisco, CA (US); Vanessa Erica Slavich, San Francisco, CA (US); Brielle Alyse Rajkovich, San Francisco, CA (US); Mathew Wilson, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 419 days.

(21) Appl. No.: 13/829,658

(22) Filed: Mar. 14, 2013

(51) Int. Cl.
*G06Q 20/32* (2012.01)
*G06Q 20/10* (2012.01)

(52) U.S. Cl.
CPC ................ *G06Q 20/327* (2013.01)

(58) Field of Classification Search
CPC ...... G06Q 40/00; G06Q 20/32; G06Q 20/108; H04M 1/66
USPC .......................................................... 705/65
See application file for complete search history.

(56) References Cited

U.S. PATENT DOCUMENTS

| | | |
|---|---|---|
| 5,590,038 A | 12/1996 | Pitroda |
| 5,652,421 A | 7/1997 | Veeneman et al. |
| 5,878,337 A | 3/1999 | Joao et al. |
| 5,960,411 A | 9/1999 | Hartman et al. |
| 6,154,738 A | 11/2000 | Call |
| 6,175,922 B1 | 1/2001 | Wang |
| 6,193,155 B1 | 2/2001 | Walker et al. |
| 6,263,352 B1 | 7/2001 | Cohen |
| 6,330,544 B1 | 12/2001 | Walker et al. |
| 6,341,353 B1 | 1/2002 | Herman et al. |
| 7,085,812 B1 | 8/2006 | Sherwood |

(Continued)

FOREIGN PATENT DOCUMENTS

| | | |
|---|---|---|
| AU | 2017235924 A1 | 10/2017 |
| CA | 2 916 603 A1 | 12/2014 |

(Continued)

OTHER PUBLICATIONS

"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.

(Continued)

*Primary Examiner* — Clifford B Madamba
(74) *Attorney, Agent, or Firm* — Mattingly & Malur, PC

(57) ABSTRACT

Method, systems, and apparatus for processing a transaction for a customer using a first device and a second device, comprising: receiving a notification from the first device, where the notification includes a selection of one or more items for purchase, where the notification includes an identifier, and where the identifier uniquely identifies both the customer and a second device; determining that the second device is in proximity to the first device as an authentication measure; in response to the determining, sending the determination to the second device, where the second device displays details regarding the selection of the one or more items for purchase; receiving, from the second device, user input indicating a confirmation of the purchase of the one or more items; submitting, to a payment processor, the details for authentication.

34 Claims, 8 Drawing Sheets

(56) References Cited

U.S. PATENT DOCUMENTS

| | | | |
|---|---|---|---|
| 7,155,411 B1 | 12/2006 | Blinn et al. | |
| 7,233,843 B2 | 6/2007 | Budhraja et al. | |
| 7,475,024 B1 | 1/2009 | Phan | |
| 7,478,054 B1 | 1/2009 | Adams et al. | |
| 7,493,390 B2* | 2/2009 | Bobde | G06Q 10/107 709/206 |
| 7,552,087 B2 | 6/2009 | Schultz et al. | |
| 7,575,166 B2* | 8/2009 | McNamara | G06Q 20/18 235/379 |
| 7,580,873 B1 | 8/2009 | Silver et al. | |
| 7,603,382 B2 | 10/2009 | Halt, Jr. | |
| 7,764,185 B1 | 7/2010 | Manz et al. | |
| 7,805,378 B2 | 9/2010 | Berardi et al. | |
| 7,810,729 B2 | 10/2010 | Morley, Jr. | |
| 7,818,809 B1 | 10/2010 | Sobel et al. | |
| 8,060,259 B2 | 11/2011 | Budhraja et al. | |
| 8,112,066 B2* | 2/2012 | Ben Ayed | G06Q 20/108 455/41.1 |
| 8,190,514 B2 | 5/2012 | Bishop et al. | |
| 8,266,551 B2* | 9/2012 | Boldyrev | G06F 9/542 715/701 |
| 8,401,710 B2 | 3/2013 | Budhraja et al. | |
| 8,423,459 B1 | 4/2013 | Green et al. | |
| 8,434,682 B1 | 5/2013 | Argue et al. | |
| 8,459,544 B2 | 6/2013 | Casey et al. | |
| 8,498,888 B1 | 7/2013 | Raff et al. | |
| 8,577,803 B2 | 11/2013 | Chatterjee et al. | |
| 8,577,810 B1 | 11/2013 | Dalit et al. | |
| 8,579,203 B1 | 11/2013 | Lambeth et al. | |
| 8,602,296 B1 | 12/2013 | Velline et al. | |
| 8,630,586 B2* | 1/2014 | Dvortsov | H04W 12/04 455/41.2 |
| 8,676,119 B2* | 3/2014 | Cohen | H04W 4/08 455/41.1 |
| 8,788,418 B2 | 7/2014 | Spodak et al. | |
| 8,855,312 B1* | 10/2014 | Hodgman | G06F 21/00 380/270 |
| 8,859,337 B2* | 10/2014 | Gaul | H01L 23/367 257/E21.499 |
| 8,892,462 B1 | 11/2014 | Borovsky et al. | |
| 8,939,357 B1 | 1/2015 | Perry | |
| 8,972,298 B2 | 3/2015 | Kunz et al. | |
| 9,010,644 B1 | 4/2015 | Workley | |
| 9,064,249 B1 | 6/2015 | Borovsky et al. | |
| 9,092,767 B1 | 7/2015 | Andrews et al. | |
| 9,092,776 B2 | 7/2015 | Dessert | |
| 9,092,828 B2 | 7/2015 | Hosp | |
| 9,195,985 B2 | 11/2015 | Domenica et al. | |
| 9,721,251 B1 | 8/2017 | Jen et al. | |
| 2002/0091646 A1 | 7/2002 | Lake et al. | |
| 2003/0014317 A1 | 1/2003 | Siegel et al. | |
| 2003/0061157 A1 | 3/2003 | Hirka et al. | |
| 2003/0065805 A1 | 4/2003 | Barnes, Jr. | |
| 2003/0115126 A1 | 6/2003 | Pitroda | |
| 2003/0115285 A1 | 6/2003 | Lee et al. | |
| 2003/0204447 A1 | 10/2003 | Dalzell et al. | |
| 2004/0030601 A1 | 2/2004 | Pond et al. | |
| 2004/0138999 A1 | 7/2004 | Friedman et al. | |
| 2004/0193489 A1 | 9/2004 | Boyd et al. | |
| 2004/0204990 A1 | 10/2004 | Lee et al. | |
| 2004/0215520 A1 | 10/2004 | Butler et al. | |
| 2004/0219971 A1 | 11/2004 | Ciancio et al. | |
| 2005/0055582 A1 | 3/2005 | Bazakos et al. | |
| 2005/0246245 A1 | 11/2005 | Satchell et al. | |
| 2006/0064373 A1 | 3/2006 | Kelley | |
| 2006/0085333 A1 | 4/2006 | Wah et al. | |
| 2006/0131385 A1 | 6/2006 | Kim | |
| 2006/0146839 A1 | 7/2006 | Hurwitz et al. | |
| 2006/0261149 A1 | 11/2006 | Raghavendra Tulluri | |
| 2007/0069013 A1 | 3/2007 | Seifert et al. | |
| 2007/0073619 A1 | 3/2007 | Smith | |
| 2007/0208930 A1* | 9/2007 | Blank | H04L 9/0827 713/150 |
| 2007/0255653 A1 | 11/2007 | Tumminaro et al. | |
| 2007/0255662 A1 | 11/2007 | Tumminaro | |
| 2008/0035725 A1* | 2/2008 | Jambunathan | G06Q 20/32 235/380 |
| 2008/0037442 A1* | 2/2008 | Bill | H04L 41/046 370/254 |
| 2008/0040265 A1 | 2/2008 | Rackley, III et al. | |
| 2008/0052176 A1 | 2/2008 | Buchheit | |
| 2008/0078831 A1 | 4/2008 | Johnson et al. | |
| 2008/0133351 A1 | 6/2008 | White et al. | |
| 2008/0177624 A9 | 7/2008 | Dohse | |
| 2008/0177826 A1 | 7/2008 | Pitroda | |
| 2008/0197188 A1 | 8/2008 | Jagatic et al. | |
| 2008/0262925 A1 | 10/2008 | Kim et al. | |
| 2008/0270246 A1 | 10/2008 | Chen | |
| 2008/0277465 A1 | 11/2008 | Pletz et al. | |
| 2008/0296978 A1* | 12/2008 | Finkenzeller | G06K 7/0008 307/104 |
| 2009/0070228 A1 | 3/2009 | Ronen | |
| 2009/0099961 A1 | 4/2009 | Ogilvy | |
| 2009/0106138 A1 | 4/2009 | Smith et al. | |
| 2009/0112766 A1 | 4/2009 | Hammad et al. | |
| 2009/0119190 A1 | 5/2009 | Realini | |
| 2009/0159663 A1 | 6/2009 | Mullen et al. | |
| 2009/0192904 A1 | 7/2009 | Patterson et al. | |
| 2009/0266884 A1 | 10/2009 | Killian et al. | |
| 2009/0271063 A1 | 10/2009 | Lay et al. | |
| 2009/0288012 A1 | 11/2009 | Hertel et al. | |
| 2009/0313132 A1 | 12/2009 | McKenna et al. | |
| 2009/0319421 A1 | 12/2009 | Mathis et al. | |
| 2009/0319638 A1 | 12/2009 | Faith et al. | |
| 2010/0010906 A1 | 1/2010 | Grecia | |
| 2010/0076777 A1* | 3/2010 | Paretti | G06Q 30/02 705/1.1 |
| 2010/0082420 A1 | 4/2010 | Trifiletti et al. | |
| 2010/0102125 A1 | 4/2010 | Gatto | |
| 2010/0174596 A1 | 7/2010 | Gilman et al. | |
| 2010/0223145 A1 | 9/2010 | Dragt | |
| 2010/0269059 A1 | 10/2010 | Othmer et al. | |
| 2010/0306099 A1 | 12/2010 | Hirson et al. | |
| 2011/0029416 A1 | 2/2011 | Greenspan | |
| 2011/0047013 A1 | 2/2011 | McKenzie, III | |
| 2011/0055084 A1* | 3/2011 | Singh | G06Q 20/1085 705/43 |
| 2011/0071892 A1 | 3/2011 | Dickelman | |
| 2011/0087550 A1 | 4/2011 | Fordyce, III et al. | |
| 2011/0131128 A1 | 6/2011 | Vaananen | |
| 2011/0145049 A1 | 6/2011 | Hertel et al. | |
| 2011/0145052 A1 | 6/2011 | Lin et al. | |
| 2011/0178883 A1 | 7/2011 | Granbery et al. | |
| 2011/0180598 A1 | 7/2011 | Morgan et al. | |
| 2011/0218871 A1 | 9/2011 | Singh | |
| 2011/0246284 A1 | 10/2011 | Chaikin et al. | |
| 2011/0251892 A1 | 10/2011 | Laracey | |
| 2011/0251962 A1 | 10/2011 | Hruska | |
| 2011/0258014 A1 | 10/2011 | Evangelist et al. | |
| 2011/0258689 A1* | 10/2011 | Cohen | H04L 63/061 726/7 |
| 2011/0270747 A1 | 11/2011 | Xu | |
| 2011/0276418 A1 | 11/2011 | Velani | |
| 2011/0295750 A1 | 12/2011 | Rammal | |
| 2011/0302019 A1* | 12/2011 | Proctor, Jr. | G06Q 30/0623 705/14.27 |
| 2011/0302080 A1 | 12/2011 | White et al. | |
| 2011/0313840 A1 | 12/2011 | Mason et al. | |
| 2011/0313867 A9 | 12/2011 | Silver | |
| 2011/0313871 A1 | 12/2011 | Greenwood | |
| 2011/0320345 A1 | 12/2011 | Taveau et al. | |
| 2012/0011072 A1 | 1/2012 | Lodolo | |
| 2012/0016731 A1 | 1/2012 | Smith et al. | |
| 2012/0029990 A1 | 2/2012 | Fisher | |
| 2012/0030044 A1 | 2/2012 | Hurst | |
| 2012/0059701 A1 | 3/2012 | van der Veen et al. | |
| 2012/0059718 A1 | 3/2012 | Ramer et al. | |
| 2012/0059758 A1 | 3/2012 | Carlson | |
| 2012/0084210 A1 | 4/2012 | Farahmand | |
| 2012/0089418 A1 | 4/2012 | Kamath et al. | |
| 2012/0095867 A1 | 4/2012 | McKelvey | |
| 2012/0095871 A1 | 4/2012 | Dorsey et al. | |

(56) References Cited

U.S. PATENT DOCUMENTS

| | | | |
|---|---|---|---|
| 2012/0096188 A1* | 4/2012 | Cohen | H04W 8/186 710/10 |
| 2012/0110568 A1* | 5/2012 | Abel | G06F 8/61 717/178 |
| 2012/0143772 A1 | 6/2012 | Abadir | |
| 2012/0150611 A1 | 6/2012 | Isaacson et al. | |
| 2012/0150643 A1 | 6/2012 | Wolfe et al. | |
| 2012/0150742 A1 | 6/2012 | Poon et al. | |
| 2012/0166311 A1 | 6/2012 | Dwight et al. | |
| 2012/0185306 A1 | 7/2012 | Cheng | |
| 2012/0185355 A1 | 7/2012 | Kilroy | |
| 2012/0197740 A1 | 8/2012 | Grigg et al. | |
| 2012/0197743 A1 | 8/2012 | Grigg et al. | |
| 2012/0197794 A1 | 8/2012 | Grigg et al. | |
| 2012/0209749 A1 | 8/2012 | Hammad et al. | |
| 2012/0209773 A1 | 8/2012 | Ranganathan | |
| 2012/0214416 A1 | 8/2012 | Kent et al. | |
| 2012/0244885 A1 | 9/2012 | Hefetz | |
| 2012/0254031 A1 | 10/2012 | Walker et al. | |
| 2012/0271707 A1 | 10/2012 | Harrison et al. | |
| 2012/0271725 A1 | 10/2012 | Cheng | |
| 2012/0278727 A1* | 11/2012 | Ananthakrishnan | G06F 3/0486 715/748 |
| 2012/0284036 A1 | 11/2012 | Evans | |
| 2012/0290422 A1 | 11/2012 | Bhinder | |
| 2012/0290609 A1 | 11/2012 | Britt | |
| 2012/0296679 A1 | 11/2012 | Im | |
| 2012/0296726 A1 | 11/2012 | Dessert et al. | |
| 2012/0323685 A1* | 12/2012 | Ullah | G01S 5/02 705/14.53 |
| 2013/0006773 A1* | 1/2013 | Lutnick | G07F 17/32 705/14.58 |
| 2013/0019284 A1 | 1/2013 | Pacyga et al. | |
| 2013/0024341 A1* | 1/2013 | Jeon | G06Q 20/32 705/35 |
| 2013/0024364 A1 | 1/2013 | Shrivastava et al. | |
| 2013/0024371 A1 | 1/2013 | Hariramani et al. | |
| 2013/0030889 A1 | 1/2013 | Davich et al. | |
| 2013/0041824 A1 | 2/2013 | Gupta | |
| 2013/0048719 A1 | 2/2013 | Bennett | |
| 2013/0050080 A1* | 2/2013 | Dahl | G01S 5/18 345/158 |
| 2013/0054320 A1 | 2/2013 | Dorso et al. | |
| 2013/0065672 A1* | 3/2013 | Gelman | G07F 17/32 463/25 |
| 2013/0066783 A1* | 3/2013 | Wolff | G06Q 20/223 705/44 |
| 2013/0073363 A1 | 3/2013 | Boal | |
| 2013/0103574 A1 | 4/2013 | Conrad et al. | |
| 2013/0103946 A1* | 4/2013 | Binenstock | H04L 63/0492 713/168 |
| 2013/0117329 A1 | 5/2013 | Bank et al. | |
| 2013/0124333 A1* | 5/2013 | Doughty | G06Q 30/0269 705/14.66 |
| 2013/0132140 A1 | 5/2013 | Amin et al. | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0134962 A1 | 5/2013 | Kamel et al. | |
| 2013/0138563 A1 | 5/2013 | Gilder et al. | |
| 2013/0144707 A1 | 6/2013 | Issacson et al. | |
| 2013/0151613 A1 | 6/2013 | Dhawan et al. | |
| 2013/0159081 A1 | 6/2013 | Shastry et al. | |
| 2013/0159172 A1 | 6/2013 | Kim | |
| 2013/0159173 A1 | 6/2013 | Sivaraman et al. | |
| 2013/0159446 A1 | 6/2013 | Carlson et al. | |
| 2013/0166402 A1 | 6/2013 | Parento et al. | |
| 2013/0166445 A1 | 6/2013 | Issacson et al. | |
| 2013/0173407 A1 | 7/2013 | Killian et al. | |
| 2013/0179227 A1 | 7/2013 | Booth et al. | |
| 2013/0181045 A1 | 7/2013 | Dessert et al. | |
| 2013/0198018 A1 | 8/2013 | Baig | |
| 2013/0204727 A1 | 8/2013 | Rothschild | |
| 2013/0204777 A1 | 8/2013 | Irwin, Jr. et al. | |
| 2013/0204793 A1 | 8/2013 | Kerridge et al. | |
| 2013/0218697 A1 | 8/2013 | Kingston et al. | |
| 2013/0218721 A1 | 8/2013 | Borhan et al. | |
| 2013/0225081 A1* | 8/2013 | Doss | H04W 4/206 455/41.2 |
| 2013/0228616 A1 | 9/2013 | Bhosle et al. | |
| 2013/0236109 A1 | 9/2013 | Madden et al. | |
| 2013/0246203 A1 | 9/2013 | Laracey | |
| 2013/0246207 A1 | 9/2013 | Novak et al. | |
| 2013/0246280 A1 | 9/2013 | Kirsch | |
| 2013/0246301 A1 | 9/2013 | Radhakrishnan et al. | |
| 2013/0248591 A1 | 9/2013 | Look et al. | |
| 2013/0268431 A1 | 10/2013 | Mohsenzadeh | |
| 2013/0290173 A1 | 10/2013 | Nemeroff | |
| 2013/0290522 A1* | 10/2013 | Behm, Jr. | H04L 43/10 709/224 |
| 2013/0291018 A1* | 10/2013 | Billings | H04L 51/32 725/46 |
| 2013/0297933 A1 | 11/2013 | Fiducia et al. | |
| 2013/0317835 A1 | 11/2013 | Mathew | |
| 2013/0317950 A1 | 11/2013 | Abraham et al. | |
| 2013/0332354 A1 | 12/2013 | Rhee et al. | |
| 2013/0332385 A1 | 12/2013 | Kilroy et al. | |
| 2013/0339253 A1 | 12/2013 | Sincai | |
| 2013/0346223 A1 | 12/2013 | Prabhu et al. | |
| 2014/0006205 A1 | 1/2014 | Berry et al. | |
| 2014/0012754 A1 | 1/2014 | Hanson et al. | |
| 2014/0019236 A1 | 1/2014 | Argue et al. | |
| 2014/0025446 A1 | 1/2014 | Nagarajan et al. | |
| 2014/0032297 A1 | 1/2014 | Germann et al. | |
| 2014/0052617 A1 | 2/2014 | Chawla et al. | |
| 2014/0057667 A1* | 2/2014 | Blankenship | H04L 67/303 455/500 |
| 2014/0058861 A1 | 2/2014 | Argue et al. | |
| 2014/0067557 A1 | 3/2014 | van Niekerk et al. | |
| 2014/0074569 A1 | 3/2014 | Francis et al. | |
| 2014/0074655 A1 | 3/2014 | Lim et al. | |
| 2014/0074658 A1 | 3/2014 | Sanchez | |
| 2014/0074691 A1 | 3/2014 | Bank et al. | |
| 2014/0074716 A1 | 3/2014 | Ni | |
| 2014/0081783 A1 | 3/2014 | Paranjape et al. | |
| 2014/0081853 A1 | 3/2014 | Sanchez et al. | |
| 2014/0081854 A1 | 3/2014 | Sanchez et al. | |
| 2014/0084059 A1 | 3/2014 | Sierchio et al. | |
| 2014/0089073 A1 | 3/2014 | Jacobs et al. | |
| 2014/0089078 A1 | 3/2014 | Dessert et al. | |
| 2014/0096179 A1* | 4/2014 | Ben-Shalom | H04L 63/0869 726/1 |
| 2014/0099888 A1* | 4/2014 | Flanagan | H04W 4/023 455/41.1 |
| 2014/0100931 A1 | 4/2014 | Sanchez et al. | |
| 2014/0100973 A1 | 4/2014 | Brown et al. | |
| 2014/0101737 A1 | 4/2014 | Rhee | |
| 2014/0108245 A1 | 4/2014 | Drummond et al. | |
| 2014/0114775 A1 | 4/2014 | Cloin et al. | |
| 2014/0114781 A1 | 4/2014 | Watanabe | |
| 2014/0122345 A1 | 5/2014 | Argue et al. | |
| 2014/0129135 A1 | 5/2014 | Holden et al. | |
| 2014/0129302 A1 | 5/2014 | Amin et al. | |
| 2014/0129357 A1 | 5/2014 | Goodwin | |
| 2014/0129942 A1 | 5/2014 | Rathod | |
| 2014/0129951 A1 | 5/2014 | Amin et al. | |
| 2014/0136318 A1* | 5/2014 | Alberth, Jr. | G06Q 30/02 705/14.53 |
| 2014/0136349 A1 | 5/2014 | Dave et al. | |
| 2014/0149282 A1 | 5/2014 | Philliou et al. | |
| 2014/0156508 A1 | 6/2014 | Argue et al. | |
| 2014/0156517 A1 | 6/2014 | Argue et al. | |
| 2014/0164234 A1 | 6/2014 | Coffman et al. | |
| 2014/0180805 A1 | 6/2014 | Argue et al. | |
| 2014/0184505 A1* | 7/2014 | Fullerton | G06F 1/169 345/158 |
| 2014/0201067 A1 | 7/2014 | Lai et al. | |
| 2014/0207669 A1 | 7/2014 | Rosenberg | |
| 2014/0214567 A1 | 7/2014 | Llach et al. | |
| 2014/0214652 A1 | 7/2014 | Zheng et al. | |
| 2014/0236762 A1 | 8/2014 | Gerber et al. | |
| 2014/0249947 A1 | 9/2014 | Hicks et al. | |

(56) References Cited

U.S. PATENT DOCUMENTS

| | | |
|---|---|---|
| 2014/0250002 A1 | 9/2014 | Issacson et al. |
| 2014/0254820 A1* | 9/2014 | Gardenfors ............ H04R 3/005 381/80 |
| 2014/0257958 A1 | 9/2014 | Andrews |
| 2014/0278589 A1* | 9/2014 | Rados .................... G06Q 50/12 705/5 |
| 2014/0279098 A1 | 9/2014 | Ham |
| 2014/0279184 A1 | 9/2014 | Lai et al. |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0112822 A1 | 4/2015 | Aaron et al. |
| 2015/0112838 A1 | 4/2015 | Li et al. |
| 2015/0120418 A1 | 4/2015 | Cervenka et al. |
| 2015/0134439 A1 | 5/2015 | Maxwell et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0194023 A1 | 7/2015 | Brackenridge et al. |
| 2015/0294312 A1 | 10/2015 | Kendrick et al. |
| 2016/0086166 A1 | 3/2016 | Pomeroy et al. |

FOREIGN PATENT DOCUMENTS

| | | |
|---|---|---|
| CA | 2 930 186 A1 | 5/2015 |
| KR | 10-2006-0103089 A | 9/2006 |
| WO | 2014/210020 A1 | 12/2014 |
| WO | 2015/061005 A1 | 4/2015 |
| WO | 2015/069389 A1 | 5/2015 |
| WO | 2015/100378 A1 | 7/2015 |
| WO | 2015/179316 A1 | 11/2015 |

OTHER PUBLICATIONS

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
U.S. Appl. No. 13/829,080, of Morgan, T.B., et al., filed Mar. 14, 2013.
U.S. Appl. No. 13/830,350, of Morgan, T.B., et al., filed Mar. 14, 2013.
U.S. Appl. No. 13/837,562, of Chin, H.C.A., et al., filed Mar. 15, 2013.
U.S. Appl. No. 14/088,141, of Maxwell, D.W., et al., filed Nov. 22, 2013.
U.S. Appl. No. 14/149,754, of Spindel, N., et al., filed Jan. 7, 2014.
U.S. Appl. No. 14/160,490, of Moring, D., et al., filed Jan. 21, 2014.
U.S. Appl. No. 14/165,256, of Aaron, P., filed Jan. 27, 2014.
U.S. Appl. No. 14/168,274 of Odawa, A., et al., filed Jan. 30, 2014.
U.S. Appl. No. 14/182,655, of Spindel, N., et al., filed Feb. 18, 2014.
U.S. Appl. No. 14/184,503, of Borovsky, A., et al., filed Feb. 19, 2014.
U.S. Appl. No. 14/189,869, of Lamba, K., et al., filed Feb. 25, 2014.
U.S. Appl. No. 14/189,880, of Aaron, P., et al., filed Feb. 25, 2014.
U.S. Appl. No. 14/197,704, of Lamba, K., et al., filed Mar. 5, 2014.
U.S. Appl. No. 14/208,800, of Thome, J.P., et al., filed Mar. 13, 2014.
U.S. Appl. No. 14/225,338, of Aaron, P., et al., filed Mar. 25, 2014.
U.S. Appl. No. 14/329,638, of Aaron, P., et al., filed Jul. 11, 2014.
U.S. Appl. No. 14/329,658, of Aaron, P., et al., filed Jul. 11, 2014.
U.S. Appl. No. 14/526,361, of White, M.W., et al., filed Oct. 28, 2014.
U.S. Appl. No. 14/692,655 of Borovsky, A., et al., filed Apr. 21, 2015.
U.S. Appl. No. 14/730,860, of Sasmaz, Y., et al., filed Jun. 4, 2015.
Non-Final Office Action dated Apr. 4, 2014, for U.S. Appl. No. 14/172,842, of Borovsky, A., et al., filed Feb. 4, 2014.
Non-Final Office Action dated Apr. 10, 2014, for U.S. Appl. No. 14/160,490, of Moring, D., et al., filed Jan. 21, 2014.
Restriction Requirement dated Apr. 28, 2014, for U.S. Appl. No. 14/165,256, of Aaron, P., filed Jan. 27, 2014.
Non-Final Office Action dated May 29, 2014, for U.S. Appl. No. 13/837,562, of Chin, H.C.A., et al., filed Mar. 15, 2013.
Notice of Allowance dated Aug. 1, 2014, for U.S. Appl. No. 14/172,842, of Borovsky, A., et al., filed Feb. 4, 2014.
Non-Final Office Action dated Aug. 27, 2014, U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Jan. 9, 2015, U.S. Appl. No. 14/145,895, of Aaron, P., et al., filed Dec. 31, 2013.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Jan. 26, 2015, for U.S. Appl. No. 13/837,562, of Chin, H.C.A., et al., filed Mar. 15, 2013.
Notice of Allowance dated Feb. 20, 2015, for U.S. Appl. No. 14/513,076, of Borovsky, A., et al., filed Oct. 13, 2014.
Restriction Requirement dated Apr. 9, 2015, for U.S. Appl. No. 14/225,338, of Aaron, P., et al., filed Mar. 25, 2014.
Non-Final Office Action dated Apr. 27, 2015, for U.S. Appl. No. 14/184,503, of Borovsky, A., et al., filed Feb. 19, 2014.
Non-Final Office Action dated May 12, 2015, for U.S. Appl. No. 14/189,869, of Lamba, K., et al., filed Feb. 25, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jun. 11, 2015, for U.S. Appl. No. 14/692,655, of Borovsky, A., et al., filed Apr. 21, 2015.
Restriction Requirement dated Jun. 19, 2015, for U.S. Appl. No. 14/329,658, of Aaron, P., et al., filed Jul. 11, 2014.
International Search Report and Written Opinion, for PCT Application No. PCT/US2014/058398, dated Dec. 24, 2014.
International Search Report and Written Opinion, for PCT Application No. PCT/US2014/058447, dated Jan. 15, 2015.
International Search Report and Written Opinion, for PCT Application No. PCT/US2014/072269, dated Mar. 31, 2015.
*Online Shopping.* Wikipedia. Last modified on Nov. 2, 2014. Retrieved on Nov. 10, 2014. Retrieved from the internet: URL<http://en.wikipedia.org/wiki/Online_shopping/>. 12 pages.
Goode, Lauren. *Paying With Square's New Mobile-Payments App.* All Things D. Published Apr. 30, 2012. Retrieved on Nov. 7, 2014. Retrieved from the Internet: URL<http://allthingsd.com/20120430/paying-with-squares-new-mobile-payments-app/>. 3 pages.
Myers, Lysa. *What is Multi-Factor Authentication, and How Will It Change in the Future?* Intego. Published Aug. 17, 2012. Retrieved on Nov. 11, 2014. Retrieved from the Internet: URL<http://www.intego.com/mac-security-blog/what-is-multi-factor-authentication-and-how-will-it-change-in-the-future/>. 4 pages.
Non-Final Office Action dated Jul. 2, 2015, for U.S. Appl. No. 14/208,800, of Thome, J.P., et al., filed Mar. 13, 2014.
Non-Final Office Action dated Jul. 10, 2015, for U.S. Appl. No. 14/526,361, of White, M.W., et al., filed Oct. 28, 2014.
Restriction Requirement dated Jul. 24, 2015, for U.S. Appl. No. 14/182,655, of Spindel, N., et al., filed Feb. 18, 2014.
Final Office Action dated Aug. 18, 2015, for U.S. Appl. No. 14/145,895, of Aaron, P., et al., filed Dec. 31, 2013.
International Search Report and Written Opinion for PCT Application No. PCT/US2015/031423 dated Aug. 13, 2015.

(56) References Cited

OTHER PUBLICATIONS

Non-Final Office Action dated Apr. 8, 2016, for U.S. Appl. No. 14/526,361, of White, M. W., et al., filed Oct. 28, 2014.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Final Office Action dated Apr. 28, 2016, for U.S. Appl. No. 14/189,880, of Aaron, P., et al., filed Feb. 25, 2014.
Non-Final Office Action dated May 3, 2016, for U.S. Appl. No. 13/830,350, of Morgan, T. B., et al., filed Mar. 14, 2013.
Non-Final Office Action dated May 9, 2016, for U.S. Appl. No. 14/225,338, of Aaron, P., et al., filed Mar. 25, 2013.
"Merchantindustry.com—Best Merchant Services," retrieved from internet URL: https://web.archive.org/web/20121020212419/http://www.merchantindustry.com/, on Dec. 30, 2015, pp. 1-7.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J. P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M. W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Restriction Requirement dated Feb. 29, 2016, for U.S. Appl. No. 14/088,141, of Maxwell, D. W., et al., filed Nov. 22, 2013.
Non-Final Office Action dated Mar. 14, 2016, for U.S. Appl. No. 14/692,655, of Borovsky, A., et al., filed Apr. 21, 2015.
Restriction Requirement dated Mar. 16, 2016, for U.S. Appl. No. 14/088,113, of Maxwell, D. W., et al., filed Nov. 22, 2013.
Non-Final Office Action dated Mar. 24, 2016, for U.S. Appl. No. 14/145,895, of Aaron, P., et al., filed Dec. 31, 2013.
"Tracking Inventory," PayPal, dated Jan. 4, 2010, Retrieved from the Internet URL: https://www.paypal-commmunity.com/t5/How-to-use-PayPal-Archive/Tracking-inventory/td-p/19392, pp. 1-3.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K., et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Non-Final Office Action dated Oct. 8, 2015, for U.S. Appl. No. 14/149,754, of Spindel, N., et al., filed Jan. 7, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Final Office Action dated Nov. 10, 2016, for U.S. Appl. No. 13/830,350, of Morgan, T.B., et al., filed Mar. 14, 2013.
Final Office Action dated Nov. 14, 2016, for U.S. Appl. No. 14/526,361, of White, M.W., et al., filed Oct. 28, 2014.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P., et al., filed Mar. 13, 2014.
Final Office Action dated Dec. 12, 2016, for U.S. Appl. No. 14/088,141, of Maxwell, D.W., et al., filed Nov. 22, 2013.
Advisory Action dated Dec. 22, 2016, for U.S. Appl. No. 14/145,895, of Aaron, P., et al., filed Dec. 31, 2013.
Final Office Action dated Dec. 27, 2016, for U.S. Appl. No. 14/184,503, of Borovsky, A., et al., filed Feb. 19, 2014.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 7, 2016, for U.S. Appl. No. 14/208,800, of Thome, J.P., et al., filed Mar. 13, 2014.
Non-Final Office Action dated Jun. 8, 2016, for U.S. Appl. No. 14/088,141, of Maxwell, D.W., et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
Examination Report No. 2 for Australian Patent Application No. 2014302661, dated Sep. 26, 2017.
Munson, J., and Gupta, V.K., "Location-Based Notification as a General-Purpose Service," dated Sep. 28, 2002 Retrieved from the Internet URL-https://ai2-s2-pdfs.s3.amazonaws.com/1bb5/6ae0a70b030e2f2376ed246834bddcabd27b.pdf, pp. 40-44.
Non-Final Office Action dated Jan. 20, 2017, for U.S. Appl. No. 14/168,274, of Odawa, A.W., et al., fled Jan. 30, 2014.
Advisory Action dated Feb. 24, 2017, for U.S. Appl. No. 14/526,361, of White, M.W., et al., filed Oct. 28, 2014.

(56) References Cited

OTHER PUBLICATIONS

Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Examiner Requisition for Canadian Patent Application No. 2,930,186, dated Jan. 30, 2017.
Notice of Acceptance for Australian Patent Application No. 2014347192, dated Feb. 16, 2017.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Advisory Action dated Oct. 31, 2017, for U.S. Appl. No. 14/160,490, of Moring, D. et al., filed Jan. 21, 2014.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay Jak Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Apr. 16, 2015, for U.S. Appl. No. 14/062,617, of Templeton, T., et al., filed Oct. 24, 2013.
Final Office Action dated Aug. 31, 2015, for U.S. Appl. No. 14/312,397, of Varma, A.K., et al., filed Jun. 23, 2014.
Non-Final Office Action dated Jan. 14, 2016, for U.S. Appl. No. 14/312,397, of Varma, A.K., et al., filed Jun. 23, 2014.
Non-Final Office Action dated Feb. 23, 2016, for U.S. Appl. No. 14/062,617, of Templeton, T., et al., filed Oct. 24, 2013.
Non-Final Office Action dated May 5, 2016, for U.S. Appl. No. 14/312,397, of Varma, A.K., et al., filed Jun. 23, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Nov. 17, 2016, for U.S. Appl. No. 14/701,571, of Jen, M. et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K. et al., filed Jun. 23, 2014.
Examiner's Requisition for Canadian Patent Application No. 2,916,603, dated Feb. 9, 2017.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
Final Office Action dated Nov. 17, 2017, for U.S. Appl. No. 14/730,860, of Sasmaz, Y., et al., filed Jun. 4, 2015.
Non-Final Office Action dated Dec. 13, 2017, for U.S. Appl. No. 14/312,397, of Varma, A.K., et al., filed Jun. 23, 2014.

* cited by examiner

FIG. 3A

VERIFYING PROXIMITY DURING PAYMENT TRANSACTIONS

TECHNICAL FIELD

This disclosure relates to payment processing using a mobile device.

BACKGROUND

In a conventional electronic credit card transaction at an online store, the transaction is authorized and captured over a network connection. In the authorization stage, credit card information is entered into an interface of the online store, e.g., a payment form. A payment request is sent electronically from a computing device running the online store to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the online store. In the capture stage, the approved transaction is again routed from the online store to the credit card processor, card network and card issuer. The capture stage can trigger the financial transaction between the card issuer and the merchant, and optionally creates a receipt. There can also be other entities, e.g., the card acquirer, in the route of the transaction. Debit card transactions have a different routing, but also require entry of card information.

SUMMARY

A customer can purchase items for sale at an online store of the merchant. Generally, the customer enters in financial payment information, e.g., credit card information, when completing the online transaction. If a hacker steals the financial payment information, the hacker can fraudulently conduct online transactions.

Merchants can increase security of the online transaction by requiring a two factor authentication before completing an online transaction. The customer can select items for purchase on a first device, e.g., a desktop computer. The online store can request a unique identifier, e.g., a mobile phone number, associated with a second device owned by the customer. The customer can enter the unique identifier to receive a notification of the purchase at the second device, e.g., the mobile device of the customer. The customer can confirm the purchase using the second device.

The second device can determine whether it is in proximity to the first device. In some implementations, a payment service system considers the determination of proximity as a factor in approving or rejecting the transaction. In some other implementations, if the second device is not in proximity to the first device, the customer is unable to complete the transaction at the second device.

In one aspect, a method of processing a transaction for a customer using a first device and a second device, comprising: receiving a notification from the first device, where the notification includes a selection of one or more items for purchase, where the notification includes an identifier, and where the identifier uniquely identifies both the customer and a second device; determining that the second device is in proximity to the first device as an authentication measure; in response to the determining, sending the determination to the second device, where the second device displays details regarding the selection of the one or more items for purchase; receiving, from the second device, user input indicating a confirmation of the purchase of the one or more items; submitting, to a payment processor, the details for authentication.

Implementations can include one or more of the following. Determining that the second device is in proximity to the first device comprises: determining a first location of the first device; determining a second location of the second device; and determining the distance between the first location and the second location is within a predetermined distance. Sending, to both the first and second devices, confirmation of the authentication from the payment processor. The details include, for each item, a respective description and a respective price. The unique identifier is one of the following: a phone number, a pay phrase, or a password. Receiving the user input comprises receiving a swipe, at the second device, that confirms the purchase of the one or more items.

In another aspect, a method of processing a transaction for a customer using a first device and a second device, comprising: receiving, at the first device, first user input to purchase one or more items for sale; receiving an identifier for the customer, where the identifier uniquely identifies both the customer and the second device; sending, from the first device to the second device, a notification of the one or more items selected for purchase; determining that the second device is in proximity to the first device as an authentication measure; in response to the determining, displaying, at the second device, details regarding the one or more items selected for purchase; receiving, at the second device, second user input to confirm the purchase of the one or more items; and submitting, to a payment processor, the details for authentication.

Implementations can include one or more of the following features. Sending the notification to the second device comprises: sending the notification from the first device to a server; and forwarding the notification from the server to the second device. Sending the notification to the second device comprises broadcasting the notification to the second device using a short range communication protocol. The short range communication protocol is one of the following: Near Field Communication, Bluetooth, or sound. Determining that the second device is in proximity to the first device comprises: determining a first location of the first device; determining a second location of the second device; and determining the distance between the first location and the second location is within a predetermined distance. Receiving, at both the first and second devices, confirmation of the authentication from the payment processor and displaying the confirmation. The details include, for each item, a respective description and a respective price. Receiving the unique identifier comprises: displaying an input field; receiving, through the input field, the unique identifier based on input of the customer. The customer is logged into the first device, and where receiving the unique identifier comprises accessing the unique identifier from an account of the customer. The unique identifier is one of the following: a phone number, a pay phrase, or a password. Receiving the second user input comprises receiving a swipe that confirms the purchase of the one or more items.

In another aspect, a system for processing a transaction for a customer, comprising: a first device, where the first device receives first user input to purchase one or more items for sale, and where the first device receives an identifier for the customer; a second device, where the identifier uniquely identifies both the customer and the second device; and a payment processor, where one of the first device, the second device, or the payment processor determines that the second device is in proximity to the first device as an authentication measure, where in response to the determining, the second device is configured to perform operations comprising: displaying details regarding the one or more items selected for purchase; receiving second user input to confirm the purchase of the one or more items; and submitting the details for authentication to the payment processor.

In another aspect, a method of processing a transaction for a customer using a first device and a second device, comprising: receiving a notification from the first device, where the notification includes a selection of one or more items for purchase, where the notification includes an identifier, and where the identifier uniquely identifies both the customer and a second device; sending the notification to the second device, where the second device displays details regarding the selection of the one or more items for purchase; receiving, from the second device, user input indicating a confirmation of the purchase of the one or more items; determining whether the first device is in proximity to the second device as an authentication measure; submitting, to a payment processor, the details and the determination of proximity for authentication, where the payment processor determines whether to approve the transaction based at least on the determination of proximity.

Implementations can include one or more of the following features. Determining that the second device is in proximity to the first device comprises: determining a first location of the first device; determining a second location of the second device; and determining the distance between the first location and the second location is within a predetermined distance. Sending, to both the first and second devices, confirmation of the authentication from the payment processor. The details include, for each item, a respective description and a respective price. The unique identifier is one of the following: a phone number, a pay phrase, or a password. Receiving the user input comprises receiving a swipe, at the second device, that confirms the purchase of the one or more items.

In another aspect, a method of processing a transaction for a customer using a first device and a second device, comprising: receiving, at the first device, first user input to purchase one or more items for sale; receiving a unique identifier for the customer, where the unique identifier identifies both the customer and the second device; sending, from the first device to the second device, a notification of the one or more items selected for purchase; displaying, at the second device, details regarding the one or more items selected for purchase; receiving, at the second device, second user input to confirm the purchase of the one or more items; determining whether the first device is in proximity to the second device as an authentication measure; submitting, to a payment processor, the details and the determination of proximity for authentication, where the payment processor determines whether to approve the transaction based at least on the determination of proximity.

Implementations can include one or more of the following features. Sending the notification to the second device comprises: sending the notification from the first device to a server; and forwarding the notification from the server to the second device. Sending the notification to the second device comprises broadcasting the notification to the second device using a short range communication protocol. The short range communication protocol is one of the following: Near Field Communication, Bluetooth, or sound. Determining that the second device is in proximity to the first device comprises: determining a first location of the first device; determining a second location of the second device; and determining the distance between the first location and the second location is within a predetermined distance. Receiving, at both the first and second devices, confirmation of the authentication from the payment processor and displaying the confirmation. The details include, for each item, a respective description and a respective price. Receiving the unique identifier comprises: displaying an input field; receiving, through the input field, the unique identifier through input of the customer. The customer is logged into the first device, and where receiving the unique identifier comprises accessing the unique identifier from an account of the customer. The unique identifier is one of the following: a phone number, a pay phrase, or a password. Receiving the second user input comprises receiving a swipe that confirms the purchase of the one or more items.

Advantages may include one or more of the following. Online transactions can be conducted with two factor authentication, thereby increasing security for both the merchant and the customer. In particular, a payment service system can ensure the transaction is conducted using two devices that are in proximity with each other, where one of the devices is owned by the customer.

BRIEF DESCRIPTION OF THE DRAWINGS

FIGS. 3A-B are illustrations of an example user interface of the first device when conducting the transaction.

Like reference numbers and designations in the various drawings indicate like elements.

DETAILED DESCRIPTION

Figure 1:
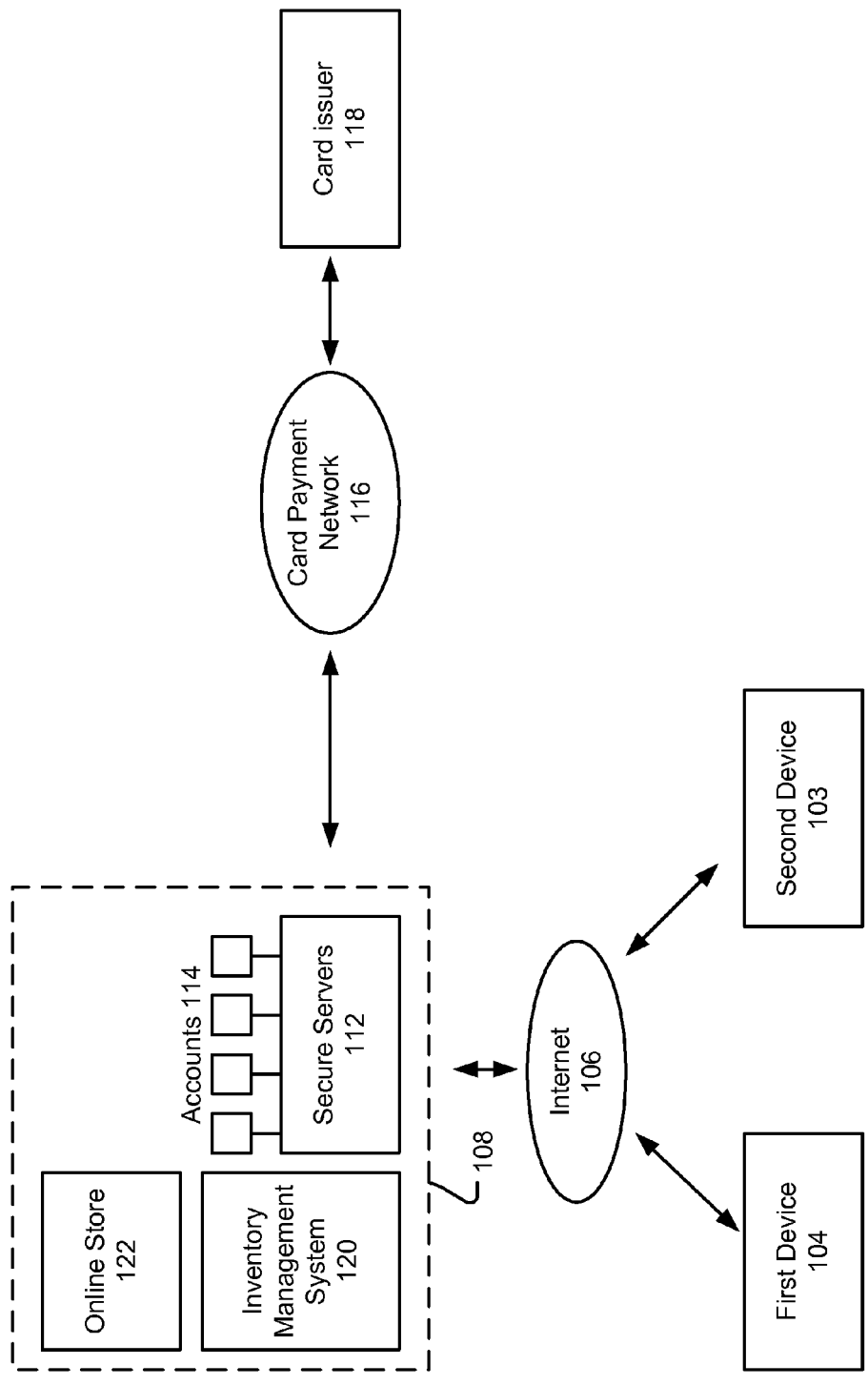
FIG. 1 is a schematic illustration of an example payment system architecture.

FIG. 1 is a schematic illustration of an example payment system architecture 100. The overall system 100 includes a first device 104, e.g., a desktop computer, connected to a network, e.g., the Internet 106. The first device 104 is a computing device capable of running an Internet browser. For example, the first device 104 can be a smartphone, tablet, a desktop computer, a laptop computer, or other data processing apparatus. The second device 103 is also a computing device connected to the Internet 106. The second device 103 can be a mobile device, e.g., a smartphone, tablet, or other portable data processing apparatus. When conducting a transaction, a customer can select items for sale from a merchant's online store using the first device 104 and confirm purchase of the selected items for sale using the second device 103. This will be described further below in reference to FIGS. 2-5.

A payment processor operates a payment service system 108. The payment processor processes transactions conducted using the first and second devices 103, 104. The first device 104 can receive selection of items for purchase and card information, e.g., through user input at an online form, for the transaction at an online store 122. The online store 122 will be described further below. The second device 103 can send confirmation of the purchases to the payment service system 108. The first and second devices 103, 104 communicate with the payment service system 108 using the network 106. The payment service system 108 includes one or more servers 112, at least some of which can handle secure transactions (e.g., using a secure server), to process all transactions with the mobile device 104. In general, servers 112 can store public merchant information such as the merchant's address or phone number. The servers 112 also handle secure information such as credit card numbers, debit card numbers, bank accounts, user accounts, user identifying information or other sensitive information.

The payment service system 108 can communicate with a computer system 116 of a card payment network, e.g., Visa or MasterCard. The payment service system 108 can communicate with a computer system 116 over the same network 106 used to communicate with the mobile device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Eventually, in order to receive funds from the transaction, the merchant will need to enter financial account information into the payment service system 108 sufficient to receive funds. For example, in the case of a bank account, the merchant can enter the bank account number and routing number. The merchant's financial account can also be associated with a credit card account or another third party financial account. In addition, in some implementations, if the merchant has not entered the financial account information, the payment processor can hold the received funds until the financial account information is provided.

The payment service system 108 can also include an inventory management system 120. The inventory management system 120 manages items for sale by the merchant, e.g., using one or more databases. For example, the inventory management system 120 can store details for each item. The details can include a title, a price, quantity, or a description of the item. Therefore, the payment service system 108 can not only process financial transactions but can also manage inventory for the merchant.

The payment service system 108 can also include the online store 122. In some implementations, a merchant operates the online store 122 using the merchant's own external systems. Inventory data for the online store 122 can be pulled from the inventory management system 120. For example, the online store 122 can host one or more resources that are accessible by browser running on a device connected to the network 106. The one or more resources can include details of the inventory owned by the merchant, e.g., pulled from a database of the inventory management system 120.

Figure 2:
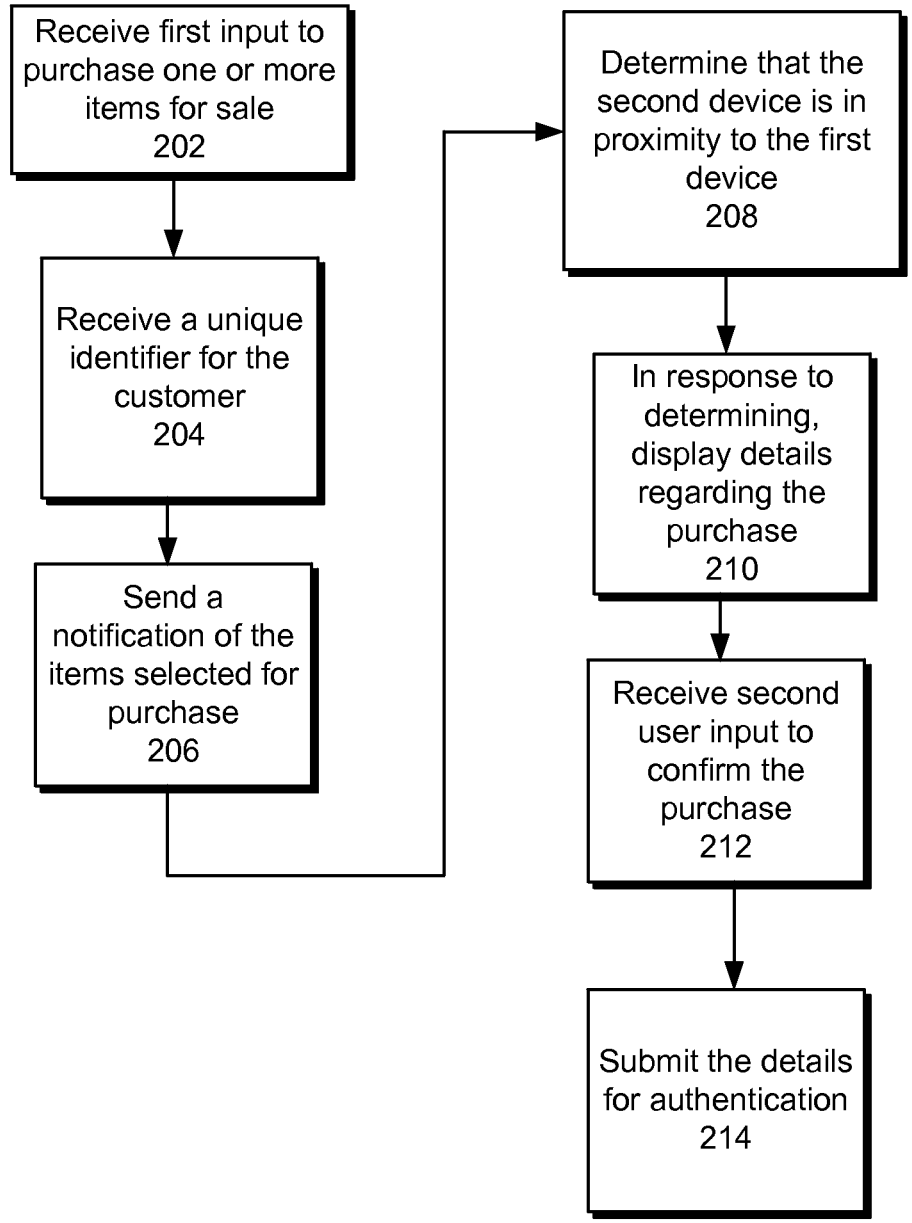
FIG. 2 is a flow chart of an example process of verifying proximity when conducting a transaction using a first device and a second device.

FIG. 2 is a flow chart of an example process of verifying proximity when conducting a transaction using a first device and a second device. For convenience, the process will be described with respect to the first device and the second device as described above in reference to FIG. 1.

The first device receives first user input to purchase one or more items for sale in an electronic transaction (step 202). The one or more items can be listed in inventory of the merchant, as described above in reference to FIG. 1. The first user input can be received at a user interface, e.g., an online storefront of the merchant or a mobile device at a physical location of the merchant, that is displayed at the first device. The first user input can include a mouse click, keyboard input, a tap, or a swipe. An example of the user interface is described further below in reference to FIGS. 3A-B.

The first device receives a unique identifier from the customer, e.g., through additional input from the customer (step 204). For example, the first device can display an input field on the user interface and instruct the customer to enter the unique identifier. The first device can receive the unique identifier through the input field based on customer input. The unique identifier can be a phone number, a unique pay phrase, e.g., "John Smith Pay Phrase", a time-based token, or a password. In some implementations, the customer can be logged into the online storefront on the first device, e.g., through an Internet cookie. For example, the customer can have previously registered a user account at the online storefront. In some implementations, the unique identifier can be stored in the Internet cookie. The unique identifier can also be stored, e.g., in a database of a payment service system, as a customized setting on a profile of the user account.

The first device can send, to the second device, a notification of the items selected for purchase (step 206). A customer can engage with the notification to start a customer application running on the second device. The notification can include details of the items selected for purchase on the first device. The details can include, for each item, a respective description and a respective price. The customer application can display the details, as will be described further below. In some implementations, the first device sends the notification to a server, e.g., through the Internet to payment service system 108 or a merchant server, and the server forwards the notification to the second device. In some other implementations, the first device broadcasts the notification using a short range communication protocol. For example, the first device can act as a Bluetooth central and the second device can act as a Bluetooth peripheral. The central can detect when the peripheral is in close proximity and can identify it as running the customer application. At that point, the central can have a server, e.g., a payment service system, authenticate the peripheral as belonging to the individual. Other implementations of determining that two devices are in proximity to each other are possible, e.g., sound from a speaker of the first device into a microphone of the second device, or Near Field Communication (NFC).

A determination can be made as to whether the first device is in proximity to the second device (step 208). The first device, the second device, or a server, e.g., a payment service system, can make the determination. The determination can serve as an authentication measure for approving the transaction. In particular, the payment service system can consider the proximity determination when determining whether to authenticate, i.e., approve, the transaction. In some implementations, a location of the first device is obtained, e.g., using a Global Positioning Satellite (GPS) or an Internet Protocol address to location database, by the first device or the server. The location can be included in the notification to the second device. Upon receiving the notification, the second device can obtain its own location, e.g., using GPS or other location methods, and compare its own location with the location included in the notification. If the two locations are within a predetermined distance, e.g., thirty feet, the first device can be determined to be in proximity to the second device. In some other implementations, the server obtains the first device's location and the second device's location, determines whether the devices are in proximity to each other, and sends the determination to the first and second devices.

In some implementations, in response to determining the first device is in proximity to the second device, the second device displays details regarding the purchase of the items selected on the first device (step 210). An example of the details displayed is described below in reference to FIGS. 4A-B. In some implementations, if the first device is not in proximity to the second device, the first or second device receives a notification that indicates the transaction cannot be completed because of the lack of proximity. That is, the second device is unable to complete the transaction if the second device is not in proximity to the first device. If the second device is in proximity to the first device, the second device can display, e.g., using a customer application, an option to confirm the purchase.

After displaying the option to confirm the purchase, the second device can receive second user input to confirm the purchase of the items selected on the first device (step 212). For example, the second device can receive a swipe of a credit card through a user interface of the second device. Upon receiving the second user input, the second device can submit, e.g., to a payment service system, transaction details for authentication. The transaction details can include details regarding the items selected for purchase. The payment service system can approve the transaction based on the confirmation from the second device and can send the approval to both the first and second devices. Upon receiving the approval, the first and second devices can display the approval on a user interface of the online storefront and the customer application, respectively.

Figure 3A:
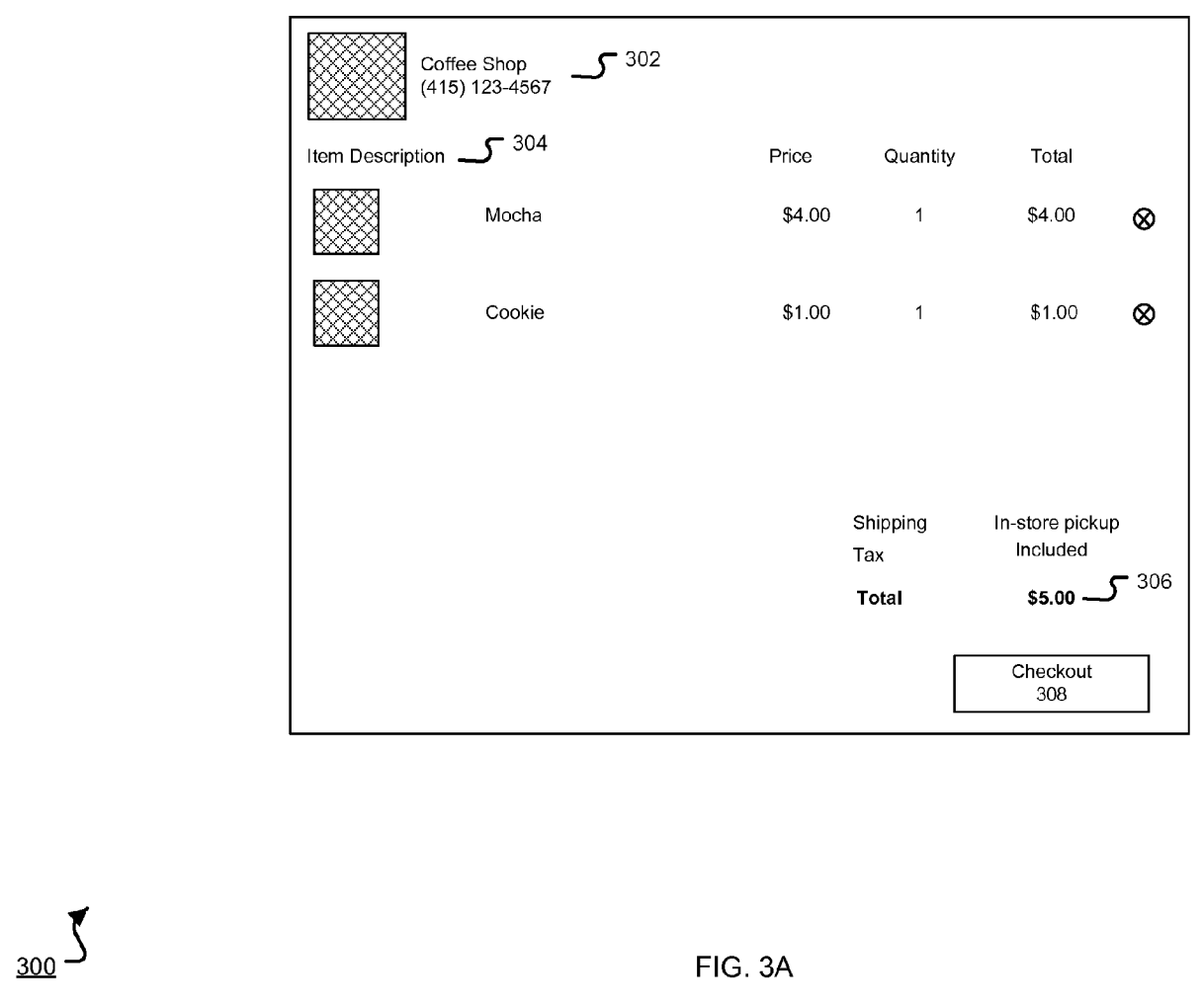
Figure 3B:
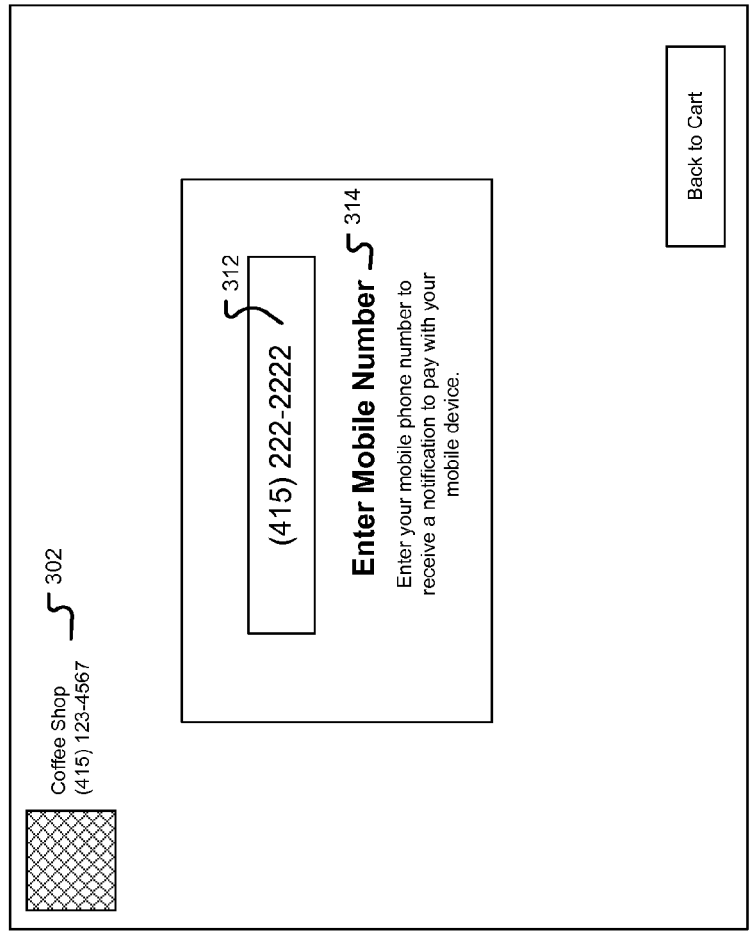

FIGS. 3A-B are illustrations of an example user interface of the first device when conducting the transaction. FIG. 3A is an example interface 300 of a shopping cart on a merchant's online storefront. A customer can use the first device to add items to the shopping cart. The shopping cart can include contact information 302 of the merchant. A customer has selected items 304 for purchase, e.g., a mocha and a cookie. The customer can choose to pick up the items in store or to be delivered to a customer's address. The item descriptions 304 include titles, prices, and quantities of the selected items. The shopping cart can display a total price 306 to the customer. The customer can interface with the checkout button 308 to continue purchasing the items.

FIG. 3B is an example interface 310 of the storefront after the customer interfaces with the checkout button 308. The first device can display a user interface, e.g., a text input field, to receive a unique identifier of the customer, as described above in reference to FIG. 2. For example, the online storefront displays a request for a mobile phone number of the customer 314. The customer can enter his or her mobile number 312, and the first device can send a notification to the second device, e.g., a mobile device associated with the mobile number.

Figure 4A:
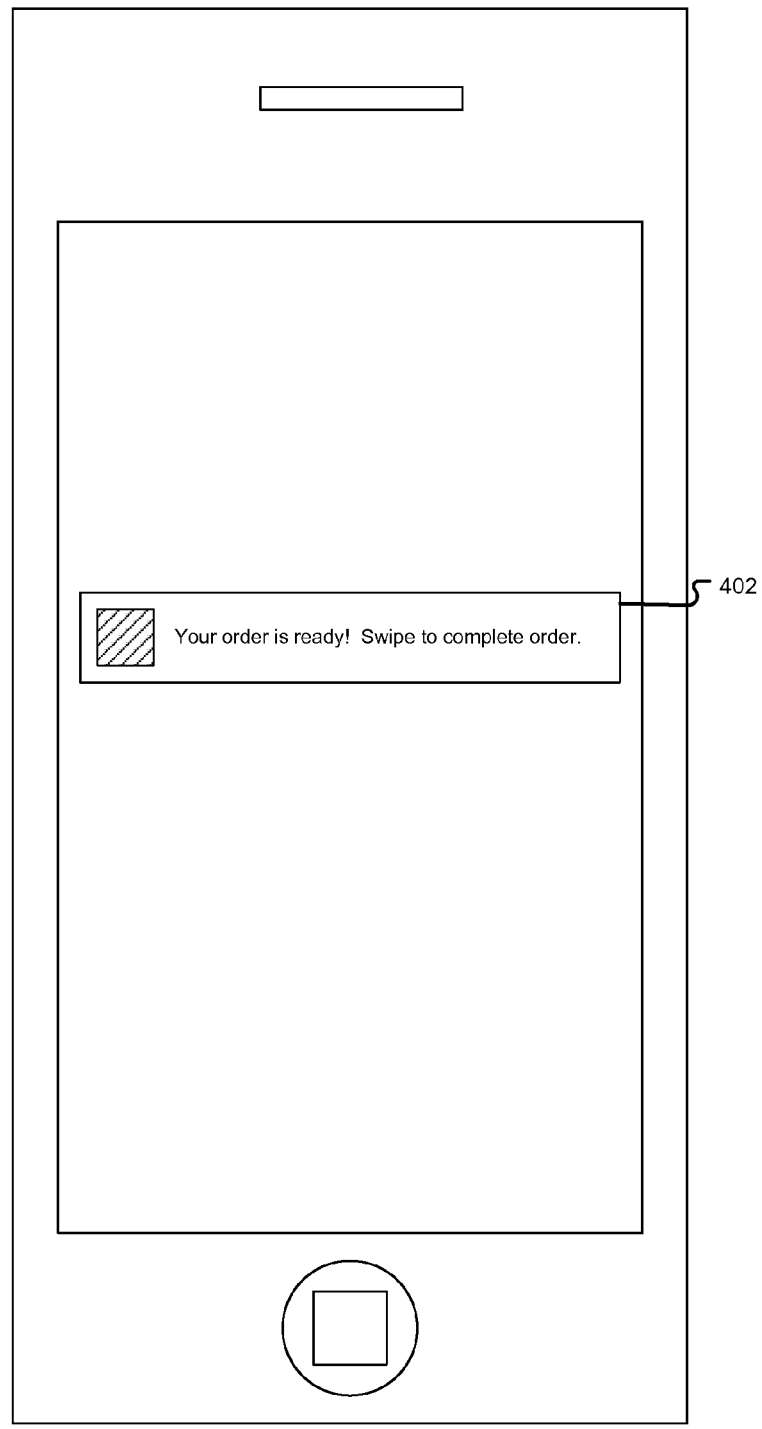
FIGS. 4A-B are illustrations of an example user interface of the second device when conducting the transaction.
Figure 4B:
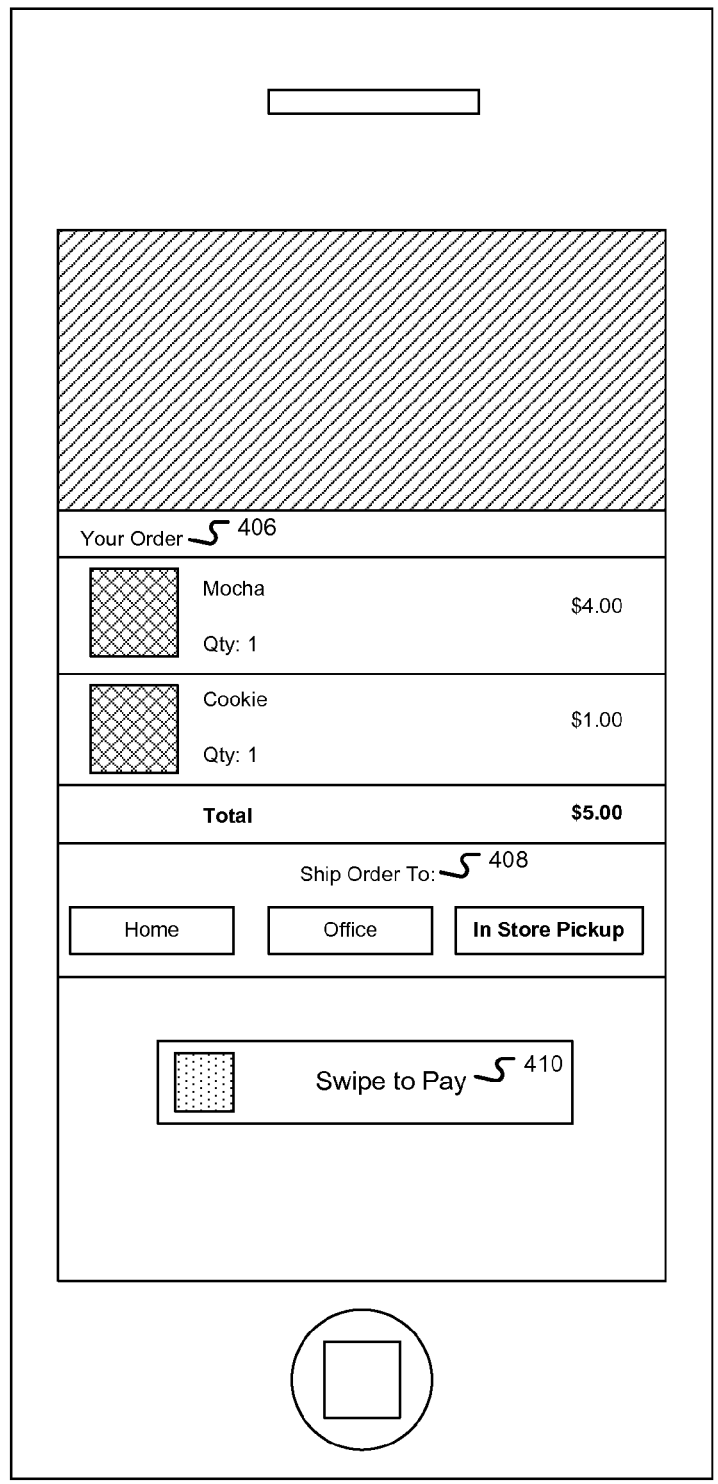

FIGS. 4A-B are illustrations of an example user interface of the second device when conducting the transaction. FIG. 4A is an example interface 400 of the second device receiving the notification 402. The customer can interface with the notification, e.g., the customer can swipe the user interface to open an application that can finish conducting the transaction.

FIG. 4B is an example interface 404 of the application running on the second device. The application can display details of the items selected for purchase on the first device 406, e.g., the mocha, the cookie, and their respective quantities and prices. In some implementations, the customer can select an address 408 to ship the order to. However, because the customer previously selected the items for in-store pickup on the first device, the second device displays the already selected shipping option on the interface. After reviewing the items selected for purchase, the customer can swipe the "Swipe to Pay" button 410 to confirm purchase of the items. Upon receiving the swipe through the user interface, the second device can submit the transaction for authentication by a payment service system as described above in reference to FIGS. 1-2.

Figure 5:
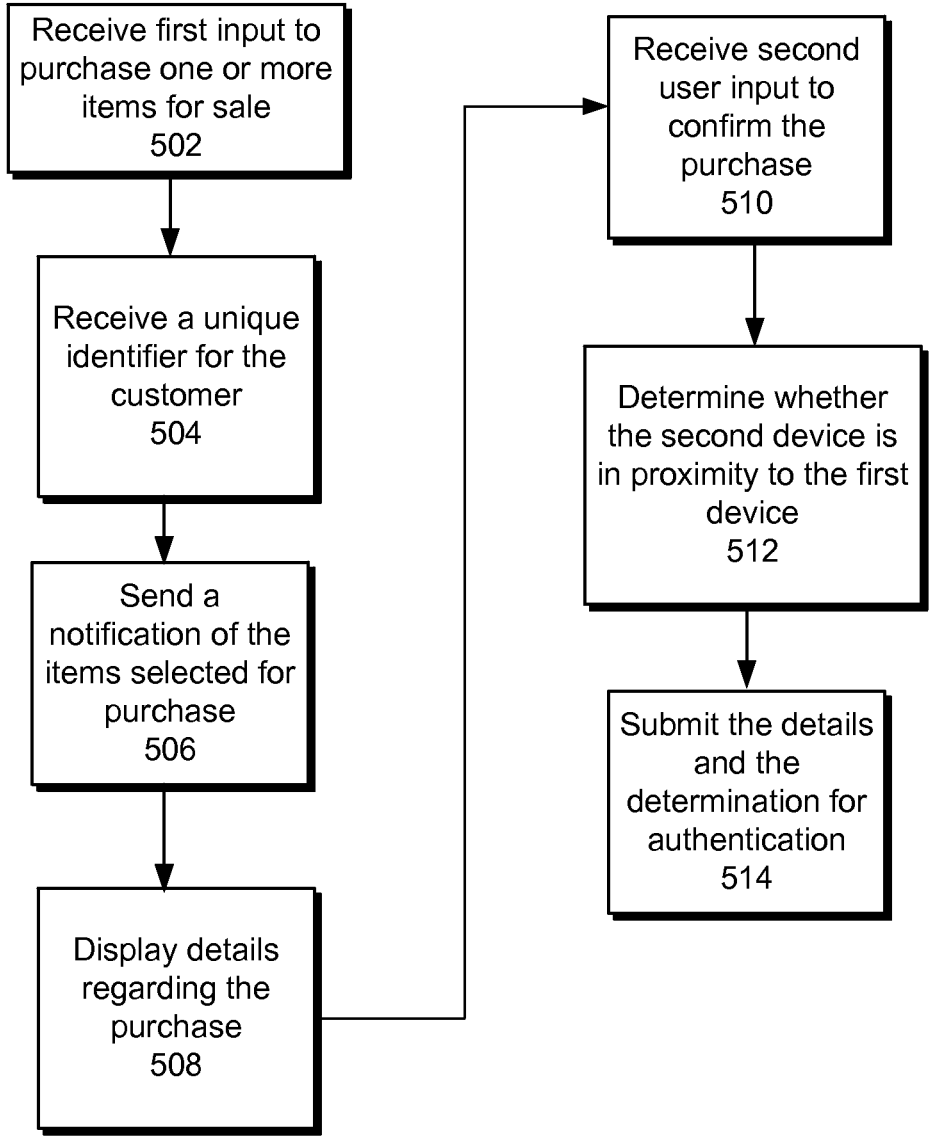
FIG. 5 is a flow chart of another example process of verifying proximity when conducting a transaction using the first device and the second device.

FIG. 5 is a flow chart of another example process 500 of verifying proximity when conducting a transaction using the first device and the second device. In some implementations, proximity between the first and second devices is not a prerequisite to completing the transaction, as described above. Instead, proximity can be considered as one factor in completing the transaction.

Similar to what is described above in reference to FIG. 2, the first device can receive first input to purchase one or more items for sale (step 502). The first device also receives a unique identifier for the customer (step 504). The first device sends, to the second device, a notification of the items selected for purchase (step 506). The second device displays details regarding the items selected for purchase (step 508). The second device receives second user input to confirm the purchase (step 510).

Then, a determination can be made, e.g., by one of the two devices or a server, as to whether the second device is in proximity to the first device (step 512). The determination can be made in the method described above in reference to FIG. 2. In some implementations, the second device determines whether it is in proximity to the first device and submits the determination along with the transaction details to a payment service system (step 514). In some other implementations, the second device submits the transaction details to the payment service system along with a location of the second device, e.g., obtained using GPS. The payment service system can determine, using the locations of the two devices, whether the first device is in proximity to the second device.

After receiving the determination, the payment service system can consider the proximity determination as a factor in determining whether to approve the transaction. For example, the payment service system can determine whether to approve transactions using a risk analysis system. The risk analysis system can weigh numerous factors, e.g., purchase history of the customer, transaction amount, a location of transaction, etc., before outputting a determination. If the second device is in proximity to the first device, the risk analysis system can determine the transaction is likely to be legitimate. That is, the risk analysis system can weigh the determination of proximity as a positive factor in approving the transaction. However, if the second device is not in proximity to the first device, the risk analysis system can approve the transaction only if certain safeguards are satisfied, e.g., the transaction amount is under a predetermined threshold or the customer has frequently purchased from the merchant. In some implementations, the risk analysis system has an increased purchase threshold if proximity was verified during the transaction. In some implementations, the risk analysis system rejects all transactions that occurred with the second device not being in proximity to the first device.

Figure 6:
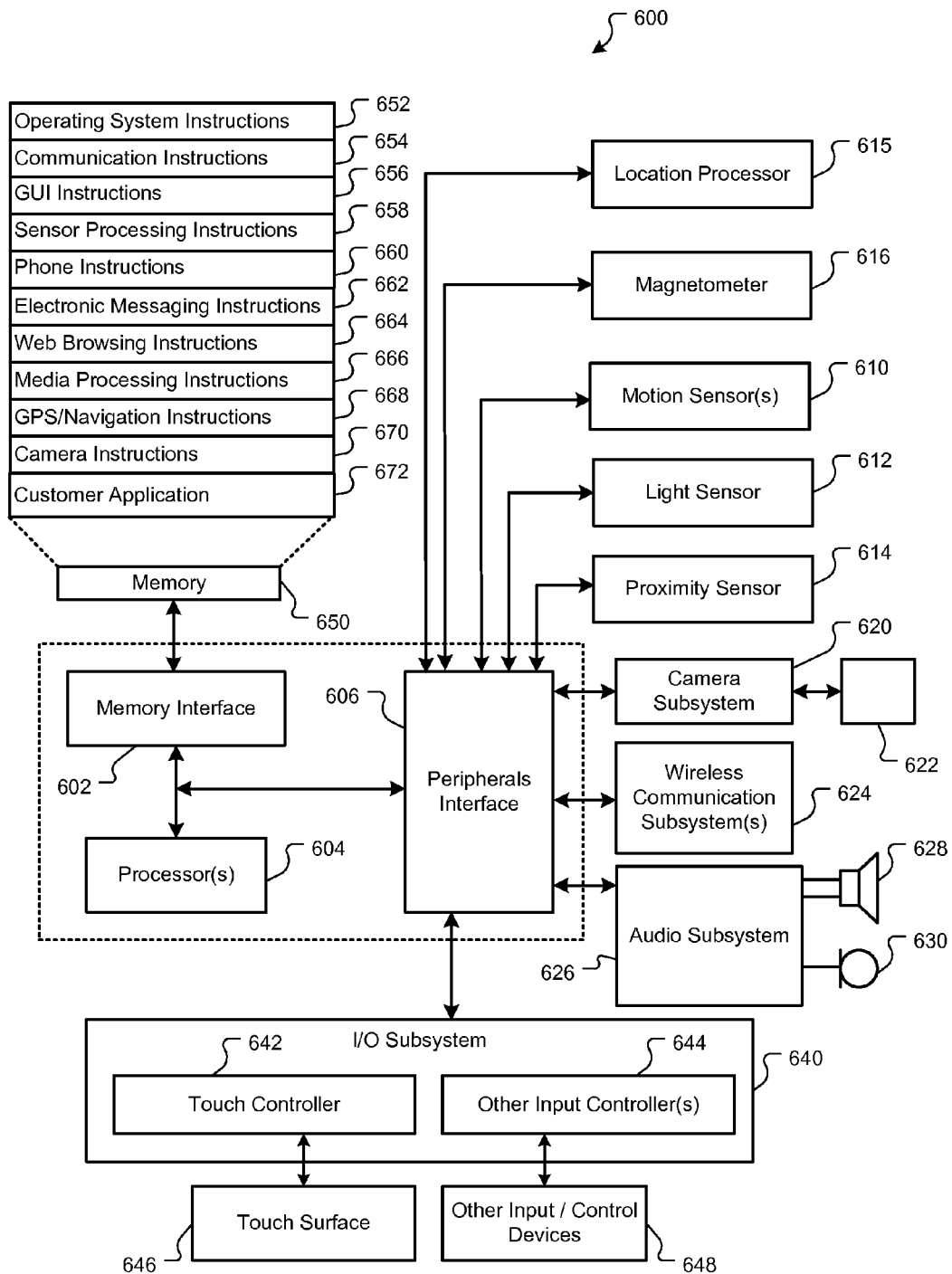
FIG. 6 is a block diagram of an exemplary architecture of a mobile device capable of running a customer application that conducts the transaction.

FIG. 6 is a block diagram of an exemplary architecture of a mobile device capable of running a customer application that conducts a transaction. Architecture 600 can be implemented in any device for generating the features described in reference to FIGS. 1-5, including but not limited to portable or desktop computers, smart phones and electronic tablets, television systems, game consoles, kiosks and the like. Architecture 600 can include memory interface 602, data processor(s), image processor(s) or central processing unit(s) 604, and peripherals interface 606. Memory interface 602, processor(s) 604 or peripherals interface 606 can be separate components or can be integrated in one or more integrated circuits. The various components can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the device. For example, in some implementations, light sensor 612 can be utilized to facilitate adjusting the brightness of touch surface 646. In some implementations, motion sensor 610 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 606, such as a temperature sensor, a biometric sensor, or other sensing device, to facilitate related functionalities.

Location processor 615 (e.g., GPS receiver) can be connected to peripherals interface 606 to provide geo-positioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems. Wireless communication subsystems 624 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 624 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 626 can be coupled to a speaker 628 and one or more microphones 630 to facilitate voice-enabled functions, such as voice recognition, voice replication, digital recording, and telephony functions.

I/O subsystem 640 can include touch controller 642 and/or other input controller(s) 644. Touch controller 642 can be coupled to a touch surface 646. Touch surface 646 and touch controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 can display virtual or soft buttons and a virtual keyboard, which can be used as an input/output device by the user.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementations, device 600 can present recorded audio and/or video files, such as MP3, AAC, and MPEG files. In some implementations, device 600 can include the functionality of an MP3 player and may include a pin connector for tethering to other devices. Other input/output and control devices can be used.

Memory interface 602 can be coupled to memory 650. Memory 650 can include high-speed random access memory or non-volatile memory, such as one or more magnetic disk storage devices, one or more optical storage devices, or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers or servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions and display GUIs; media processing instructions 666 to facilitate media processing-related processes and functions; GPS/Navigation instructions 668 to facilitate GPS and navigation-related processes; camera instructions 670 to facilitate camera-related processes and functions; and instructions 672 for running a customer application that conducts the transaction. The memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more processors of a payment service system, a notification of a transaction from a first application executing on a first device, wherein the notification includes a selection of one or more items for purchase from a merchant, wherein the notification further includes an identifier that uniquely identifies both a customer and a second device associated with the customer, wherein the second device is a mobile device, and wherein the selection is received via a first user interface presented by the first application on the first device;
   receiving, by the one or more processors, from the first application on the first device, an indication of a location of the first device based on Global Positioning System (GPS) coordinates transmitted to the one or more processors by the first device;
   sending, by the one or more processors, to the second device, based on the received identifier, an indication of the transaction;
   receiving, by the one or more processors, from a second application executing on the second device, in response to the indication of the transaction, an indication of a location of the second device based on GPS coordinates transmitted by the second application to the one or more processors;
   comparing, by the one or more processors, the GPS coordinates of the first device and the GPS coordinates of the second device to determine that the second device is in proximity to the first device;
   in response to determining the second device is in proximity to the first device, sending, by the one or more processors, to the second application executing on the second device, details regarding the selection of the one or more items to cause the second application to present a second user interface on the second device displaying the details regarding the selection for review by the customer, where the second application is associated with the payment service system;
   receiving, by the one or more processors, from the second application executing on the second device, a user input entered via the second user interface indicating a confirmation of the purchase of the one or more items; and
   submitting, by the one or more processors, to a payment processor associated with the payment service system, a determination that the second device is in proximity to the first device and the details for authentication, wherein the payment processor determines to approve the transaction based at least on the determination that the second device is in proximity to the first device.

2. The method of claim 1, where determining that the second device is in proximity to the first device comprises determining that the distance between the location of the first device and the location of the second device is within a predetermined distance by the comparing the GPS coordinates of the first device and the GPS coordinates of the second device.

3. The method of claim 1, further comprising sending, to both the first and second devices, confirmation of the authentication from the payment processor.

4. The method of claim 1, where the details include, for each of the one or more items, a respective description and a respective price.

5. The method of claim 1, where the unique identifier is one of the following: a phone number, a pay phrase, or a password.

6. The method of claim 1, where receiving the user input comprises receiving a swipe to a touchscreen virtual control presented in the second user interface on the second device, wherein the swipe indicates confirmation of the purchase of the one or more items.

7. A method comprising:
   receiving, via a first user interface presented by a first application executing on a first device, a first user input to select one or more items for purchase for a transaction;

receiving, via the first user interface presented on the first device, an indication of an identifier that uniquely identifies both a customer and a second device associated with the customer;

sending, by the first application, from the first device to the second device, based on the indication of the identifier, a notification of the one or more items selected for purchase;

determining, by the first application on the first device, that the second device is in proximity to the first device by detecting through a short range communication protocol that the second device is executing a second application and is within proximity to the first device;

in response to determining the second device is in proximity to the first device, sending, by the first application, to the second device, an indication that the second device is in proximity to the first device to cause the second application on the second device to display in a second user interface presented by the second application, details regarding the one or more items selected for purchase;

receiving, via the second user interface presented on the second device, a second user input to confirm the purchase of the one or more items; and submitting, by at least one of the second application or the first application, to a payment processor, for authentication of the transaction, an indication that the second device is determined to be in proximity to the first device and an indication of receipt of the second user input to the second user interface to confirm the purchase.

8. The method of claim 7, where sending the notification to the second device comprises broadcasting the notification to the second device using the short range communication protocol.

9. The method of claim 7, where the short range communication protocol is one of the following: Near Field Communication, Bluetooth, or sound.

10. The method of claim 7, further comprising receiving, at both the first and second devices, confirmation of the authentication from the payment processor and displaying the confirmation.

11. The method of claim 7, where the details include, for each of the one or more items, a respective description and a respective price.

12. The method of claim 7, where receiving the indication of the unique identifier comprises:
displaying, by the first application, in the first user interface, an input field at the first device; and
receiving, through the input field in the first user interface, the unique identifier based on input of the customer received via the first user interface.

13. The method of claim 7, where the customer is logged into the first device using an account, and where receiving the indication of the unique identifier comprises accessing the unique identifier from the account of the customer.

14. The method of claim 7, where the unique identifier is one of the following: a phone number, a pay phrase, or a password.

15. The method of claim 7, where receiving the second user input comprises receiving, via a virtual control presented by the second application in the second user interface on a touchscreen of the second device, a swipe of the virtual control that confirms the purchase of the one or more items.

16. A system comprising:
a first device executing a first application that configures the first device to present a first user interface on which a customer initiates a transaction by selecting one or more items for purchase, where the first application configures the first device to receive a first user input via the first user interface that specifies the one or more items for sale to be purchased, and where the first application further configures the first device to receive an indication of an identifier for the customer;

a second device that is associated with the customer, where the identifier uniquely identifies both the customer and the second device; and one or more processors configured as a payment processor, where one of the first device, the second device, or the one or more processors determine that the second device is in proximity to the first device as an authentication measure, and where in response to determining the second device is in proximity to the first device, the second device is configured by a second application executing on the second device to perform operations comprising:
displaying, by the second application in a second user interface on the second device, details regarding the one or more items selected for purchase;
receiving, via the second user interface on the second device, a second user input to confirm the purchase of the one or more items; and
submitting the details for authentication to the payment processor.

17. A method comprising:
receiving, by one or more processors of a payment system, a notification of a transaction from a first application executing on a first device, where the notification includes a selection of one or more items for purchase, and where the notification includes an identifier that uniquely identifies both a customer and a second device;

sending, by the one or more processors, based on the identifier, the notification to a second application executing on the second device, where the second application configures the second device to display a user interface including details regarding the selection of the one or more items for purchase;

receiving, by the one or more processors, from the second application executing on the second device, via the user interface, a user input indicating a confirmation of the purchase of the one or more items;

determining, by the one or more processors, a location of the first device using Global Positioning System (GPS) coordinates received from the first application executing on the first device;

determining, by the one or more processors, a location of the second device using GPS coordinates received from the second application executing on the second device;

authenticating the customer, by the one or more processors, wherein said authenticating includes determining that the first device is within a specified proximity of the second device by comparing the location of the first device to the location of the second device; and submitting, by the one or more processors, to a payment processor, the details and the determination of proximity for authentication, where the payment processor determines whether to approve the transaction based at least partially on the determination of proximity.

18. The method of claim 17, further comprising sending, to both the first and second devices, confirmation of the authentication by the payment processor.

19. The method of claim 17, where the details include, for each of the one or more items, a respective description and a respective price.

20. The method of claim 17, where the unique identifier is one of the following: a phone number, a pay phrase, or a password.

21. The method of claim 17, where receiving the user input comprises receiving, via a virtual control presented by the second application in the user interface on a touchscreen of the second device, a swipe of the virtual control, at the second device, that confirms the purchase of the one or more items.

22. A method comprising:
receiving, via a first user interface presented by a first application executing on a first device, a first user input that specifies one or more items selected for purchase by a customer for a transaction;
receiving, via the first user interface presented by the first application executing at the first device, an indication of a unique identifier that identifies both the customer and a second device associated with the customer;
sending, by the first application, from the first device to the second device, based on the received indication of the unique identifier, a notification of the one or more items selected for purchase;
displaying, via a second user interface presented by a second application executing at the second device, details regarding the one or more items selected for purchase;
receiving, via the second user interface presented by the second application executing at the second device, a second user input that confirms the purchase of the one or more items;
receiving, by one or more processors of a payment system, from the first application executing on the first device, first location information indicating a location of the first device;
receiving, by the one or more processors, from the second application executing on the second device, second location information indicating a location of the second device;
determining, by the one or more processors, based on the received first and second location information, that the first device is in proximity to the second device as an authentication measure, where said determining includes comparing the received location of the first device to the received location of the second device; and
submitting, by the one or more processors, to a payment processor, the details and the determination of proximity for authentication, where the payment processor determines whether to approve the transaction based at least on the determination of proximity.

23. The method of claim 22, where sending the notification to the second device comprises:
sending the notification from the first device to a server; and
forwarding the notification from the server to the second device.

24. The method of claim 22, where sending the notification to the second device comprises broadcasting, by the first application executing on the first device, the notification to the second device using a short range communication protocol.

25. The method of claim 24, where the short range communication protocol is one of the following: Near Field Communication, Bluetooth, or sound.

26. The method of claim 22, wherein:
the first application configures the first device to send first Global Positioning System (GPS) information as the first location information sent to the one or more processors;
the second application configures the second device to send second GPS information as the second location information sent to the one or more processors; and
determining that the first device is in proximity to the second device comprises comparing the first GPS information with the second GPS information.

27. The method of claim 22, further comprising receiving, at both the first and second devices, confirmation of the authentication from the payment processor and displaying the confirmation.

28. The method of claim 22, where the details include, for each of the one or more items, a respective description and a respective price.

29. The method of claim 22, where receiving the indication of the unique identifier comprises:
displaying, by the first application in the first user interface, an input field at the first device; and
receiving, through the input field in the first user interface, the unique identifier through input of the customer.

30. The method of claim 22, where the customer is logged into the first device using an account, and where receiving the indication of the unique identifier comprises accessing the unique identifier from the account of the customer.

31. The method of claim 22, where the unique identifier is one of the following: a phone number, a pay phrase, or a password.

32. The method of claim 22, where receiving the second user input comprises receiving, via a virtual control presented by the second application in the second user interface on a touchscreen of the second device, a swipe of the virtual control that confirms the purchase of the one or more items.

33. A system comprising:
a processor; and
a non-transitory computer-readable medium coupled to the processor and having instructions stored thereon, which, when executed by the processor, cause the processor to perform operations comprising:
receiving, by the processor, a notification from a first device, where the notification includes a selection of one or more items for purchase by a customer received via a first user interface presented by a first application executing on the first device, and where the notification includes an identifier that uniquely identifies both the customer and a second device associated with the customer;
receiving, by the processor, from the first application executing on the first device, first location information indicating a location of the first device;
receiving, by the processor, based on the received indication of the identifier, from a second application executing on the second device, second location information indicating a location of the second device;
determining, by the processor, based on the received first and second location information, that the second device is in proximity to the first device by comparing the location of the first device to the location of the second device; and
in response to making a determination that the second device is in proximity to the first device,
sending a notice of the determination to the second device to cause the second application executing on the second device to display the notice of the determination of proximity in a user interface on the second device, where the notice includes details regarding the selection of the one or more items for purchase;

receiving, from the second device, via the user interface presented by the second application, a user input indicating a confirmation of the purchase of the one or more items; and submitting, to a payment processor, the details for authentication.

34. A non-transitory computer-readable medium having instructions stored thereon, which, when executed by a processor, cause the processor to perform operations comprising:

receiving, by the processor, a notification of a transaction from a first device, wherein the notification includes a selection of one or more items for purchase by a customer, wherein the selection is received via a first user interface presented on the first device by a first application, the notification including an identifier that uniquely identifies both the customer and a second device associated with the customer;

receiving, by the processor, from the first device, an indication of a location of the first device;

sending, by the processor, based on the identifier included in the notification, the notification to the second device to cause a second application on the second device to present a second user interface that displays details regarding the selection of the one or more items for purchase received from the processor;

receiving, by the processor, from the second device, a user input indicating a confirmation of the purchase of the one or more items and an indication of a location of the second device;

authenticating, by the processor, the customer, wherein said authenticating includes determining that the first device is in proximity to the second device by comparing the location of the first device to the location of the second device; and submitting, by the processor, to a payment processor, the details and the determination of proximity for authentication, where the payment processor determines whether to approve the transaction based at least on the determination of proximity.

* * * * *